United States Patent
Lou et al.

(10) Patent No.: US 9,185,428 B2
(45) Date of Patent: Nov. 10, 2015

(54) MOTION VECTOR SCALING FOR NON-UNIFORM MOTION VECTOR GRID

(71) Applicant: Google Technology Holdings LLC, Mountain View, CA (US)

(72) Inventors: Jian Lou, San Diego, CA (US); Koohyar Minoo, San Diego, CA (US); Limin Wang, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 347 days.

(21) Appl. No.: 13/667,992

(22) Filed: Nov. 2, 2012

(65) Prior Publication Data

US 2013/0114725 A1 May 9, 2013

Related U.S. Application Data

(60) Provisional application No. 61/556,147, filed on Nov. 4, 2011.

(51) Int. Cl.
*H04N 7/36* (2006.01)
*H04N 19/59* (2014.01)
(Continued)

(52) U.S. Cl.
CPC ............. *H04N 19/59* (2013.01); *H04N 19/503* (2013.01); *H04N 19/513* (2013.01); *H04N 19/52* (2013.01); *H04N 19/523* (2013.01); *H04N 19/82* (2013.01); *H04N 19/527* (2013.01)

(58) Field of Classification Search
CPC ... H04N 19/503; H04N 19/513; H04N 19/52; H04N 19/523; H04N 19/527; H04N 19/59; H04N 19/82

USPC .................................................... 375/240.17
See application file for complete search history.

(56) References Cited

U.S. PATENT DOCUMENTS 4,924,310 A 5/1990 von Brandt
5,148,269 A 9/1992 de Haan et al.
(Continued)

FOREIGN PATENT DOCUMENTS

EP 0634873 1/1995
EP 0979011 2/2000
(Continued)

OTHER PUBLICATIONS

Patent Cooperation Treaty, PCT Search Report and Written Opinion of the International Searching Authority for International Application No. PCT/US2012/063434 dated Feb. 12, 2013, 15 pages.
(Continued)

*Primary Examiner* — Shan Elahi
(74) *Attorney, Agent, or Firm* — Young Basile Hanlon & MacFarlane P.C.

(57) ABSTRACT

In one embodiment, a method determines a scaled motion vector for a first block. A motion vector for a second block is determined where the motion vector is on a non-uniform motion vector grid. The method then maps the motion vector for the second block to a higher accuracy uniform motion vector grid that is of a higher accuracy than the non-uniform motion vector grid and scales the motion vector for the second block on the higher accuracy motion vector grid. The scaled motion vector is mapped on the higher accuracy motion vector grid to the non-uniform motion vector grid. The scaled motion vector on the non-uniform motion vector grid is associated with the first block for a temporal prediction process.

17 Claims, 9 Drawing Sheets

(51) Int. Cl.
| | |
|---|---|
| *H04N 19/52* | (2014.01) |
| *H04N 19/503* | (2014.01) |
| *H04N 19/513* | (2014.01) |
| *H04N 19/82* | (2014.01) |
| *H04N 19/523* | (2014.01) |
| *H04N 19/527* | (2014.01) |

(56) References Cited

U.S. PATENT DOCUMENTS

| | | | |
|---|---|---|---|
| 5,337,086 | A | 8/1994 | Fujinami |
| 5,398,068 | A | 3/1995 | Liu et al. |
| 5,461,708 | A | 10/1995 | Kahn |
| 5,512,952 | A | 4/1996 | Iwamura |
| 5,550,964 | A | 8/1996 | Davoust |
| 5,581,678 | A | 12/1996 | Kahn |
| 5,610,658 | A | 3/1997 | Uchida et al. |
| 5,611,034 | A | 3/1997 | Makita |
| 5,729,690 | A | 3/1998 | Jeong et al. |
| 5,731,840 | A | 3/1998 | Kikuchi et al. |
| 5,742,710 | A | 4/1998 | Hsu et al. |
| 5,886,742 | A | 3/1999 | Hibi et al. |
| 5,905,535 | A | 5/1999 | Kerdranvat |
| 5,978,030 | A | 11/1999 | Jung et al. |
| 5,987,180 | A | 11/1999 | Reitmeier |
| 5,991,447 | A | 11/1999 | Eifrig et al. |
| 6,005,980 | A | 12/1999 | Eifrig et al. |
| 6,011,870 | A | 1/2000 | Jeng et al. |
| 6,014,181 | A | 1/2000 | Sun |
| 6,058,143 | A | 5/2000 | Golin |
| 6,272,179 | B1 | 8/2001 | Kadono |
| 6,289,049 | B1 | 9/2001 | Kim et al. |
| 6,359,929 | B1 | 3/2002 | Boon |
| 6,381,277 | B1 | 4/2002 | Chun et al. |
| 6,473,460 | B1 | 10/2002 | Topper |
| 6,507,617 | B1 | 1/2003 | Karczewicz et al. |
| 6,711,211 | B1 | 3/2004 | Lainema |
| 6,735,249 | B1 | 5/2004 | Karczewicz et al. |
| 6,876,702 | B1 | 4/2005 | Hui et al. |
| 6,912,255 | B2 | 6/2005 | Drezner et al. |
| 7,002,580 | B1 | 2/2006 | Aggala et al. |
| 7,418,147 | B2 | 8/2008 | Kamaci et al. |
| 7,463,685 | B1 | 12/2008 | Haskell et al. |
| 7,580,456 | B2 | 8/2009 | Li et al. |
| 7,581,168 | B2 | 8/2009 | Boon |
| 7,606,310 | B1 | 10/2009 | Ameres et al. |
| 7,705,847 | B2 | 4/2010 | Helfman et al. |
| 7,978,770 | B2 | 7/2011 | Luo et al. |
| 8,005,144 | B2 | 8/2011 | Ji et al. |
| 8,006,194 | B2 | 8/2011 | Berger et al. |
| 8,130,840 | B2 | 3/2012 | Mishima et al. |
| 8,208,540 | B2 | 6/2012 | Cote |
| 8,345,758 | B2 | 1/2013 | Jeon |
| 8,351,505 | B2 | 1/2013 | Jeon |
| 8,442,117 | B2 | 5/2013 | Lee et al. |
| 8,451,904 | B2 * | 5/2013 | Reznik et al. ............... 375/240.2 |
| 8,559,512 | B2 | 10/2013 | Paz |
| 8,594,200 | B2 | 11/2013 | Chang et al. |
| 8,718,144 | B2 * | 5/2014 | Reznik et al. ............... 375/240.2 |
| 8,762,441 | B2 * | 6/2014 | Reznik ........................ 708/402 |
| 8,787,459 | B2 | 7/2014 | Wang |
| 8,818,114 | B2 | 8/2014 | Kim et al. |
| 8,867,618 | B2 | 10/2014 | Pandit et al. |
| 8,879,634 | B2 * | 11/2014 | Reznik ........................ 375/240.2 |
| 8,885,956 | B2 | 11/2014 | Sato |
| 8,891,626 | B1 | 11/2014 | Bankoski et al. |
| 8,908,767 | B1 | 12/2014 | Holmer |
| 2002/0031272 | A1 | 3/2002 | Bagni et al. |
| 2002/0064228 | A1 * | 5/2002 | Sethuraman et al. .... 375/240.12 |
| 2002/0118754 | A1 | 8/2002 | Choi |
| 2003/0072374 | A1 | 4/2003 | Sohm |
| 2004/0001546 | A1 | 1/2004 | Tourapis et al. |
| 2004/0028131 | A1 | 2/2004 | Ye et al. |
| 2004/0066848 | A1 | 4/2004 | Jeon |
| 2004/0218674 | A1 | 11/2004 | Kondo et al. |
| 2004/0258155 | A1 | 12/2004 | Lainema et al. |
| 2005/0117646 | A1 | 6/2005 | Joch et al. |
| 2005/0123282 | A1 | 6/2005 | Novotny et al. |
| 2005/0226333 | A1 | 10/2005 | Suzuki et al. |
| 2005/0243925 | A1 | 11/2005 | Bottreau |
| 2005/0243926 | A1 | 11/2005 | Hubrich et al. |
| 2005/0254719 | A1 | 11/2005 | Sullivan |
| 2006/0114989 | A1 | 6/2006 | Panda |
| 2006/0209961 | A1 | 9/2006 | Han et al. |
| 2006/0268166 | A1 | 11/2006 | Bossen et al. |
| 2006/0294171 | A1 | 12/2006 | Bossen et al. |
| 2007/0014358 | A1 | 1/2007 | Tourapis et al. |
| 2007/0110156 | A1 | 5/2007 | Ji et al. |
| 2007/0195881 | A1 | 8/2007 | Hagiya |
| 2007/0286280 | A1 | 12/2007 | Saigo et al. |
| 2008/0025390 | A1 | 1/2008 | Shi et al. |
| 2008/0037639 | A1 | 2/2008 | Jeon |
| 2008/0043845 | A1 | 2/2008 | Nakaishi |
| 2008/0056354 | A1 | 3/2008 | Sun et al. |
| 2008/0084931 | A1 | 4/2008 | Kondo et al. |
| 2008/0111722 | A1 | 5/2008 | Reznik |
| 2008/0159392 | A1 | 7/2008 | Chiang et al. |
| 2008/0240242 | A1 | 10/2008 | Lainema |
| 2008/0253459 | A1 * | 10/2008 | Ugur et al. ............... 375/240.17 |
| 2008/0291285 | A1 | 11/2008 | Shimizu |
| 2008/0310514 | A1 | 12/2008 | Osamoto et al. |
| 2008/0317127 | A1 | 12/2008 | Lee et al. |
| 2009/0016439 | A1 | 1/2009 | Thoreau et al. |
| 2009/0067497 | A1 | 3/2009 | Jeon |
| 2009/0074062 | A1 | 3/2009 | Jeon |
| 2009/0074067 | A1 | 3/2009 | Jeon |
| 2009/0110077 | A1 | 4/2009 | Amano et al. |
| 2009/0125538 | A1 | 5/2009 | Rosenzweig et al. |
| 2009/0129474 | A1 | 5/2009 | Pandit et al. |
| 2009/0290643 | A1 | 11/2009 | Yang |
| 2010/0079624 | A1 | 4/2010 | Miyasako |
| 2010/0284469 | A1 | 11/2010 | Sato et al. |
| 2010/0322301 | A1 | 12/2010 | Karkkainen |
| 2011/0026820 | A1 | 2/2011 | Strom et al. |
| 2011/0096837 | A1 * | 4/2011 | Demos ..................... 375/240.15 |
| 2011/0110428 | A1 | 5/2011 | Chang et al. |
| 2011/0170597 | A1 | 7/2011 | Shi et al. |
| 2011/0170602 | A1 | 7/2011 | Lee et al. |
| 2011/0188583 | A1 * | 8/2011 | Toraichi et al. .......... 375/240.27 |
| 2011/0243229 | A1 | 10/2011 | Kim et al. |
| 2011/0261886 | A1 | 10/2011 | Suzuki et al. |
| 2011/0293010 | A1 | 12/2011 | Jeong et al. |
| 2012/0014440 | A1 | 1/2012 | Segall et al. |
| 2012/0075535 | A1 | 3/2012 | Van Beek |
| 2012/0134415 | A1 | 5/2012 | Lin et al. |
| 2012/0263231 | A1 | 10/2012 | Zhou |
| 2012/0294363 | A1 | 11/2012 | Lee et al. |
| 2012/0300845 | A1 * | 11/2012 | Endresen et al. ........ 375/240.16 |
| 2012/0307905 | A1 | 12/2012 | Kim et al. |
| 2013/0003851 | A1 | 1/2013 | Yu et al. |
| 2013/0022127 | A1 | 1/2013 | Park et al. |
| 2013/0027230 | A1 | 1/2013 | Marpe et al. |
| 2013/0089149 | A1 | 4/2013 | Hayashi et al. |
| 2013/0089266 | A1 | 4/2013 | Yang et al. |
| 2014/0092975 | A1 | 4/2014 | Yu et al. |
| 2014/0098877 | A1 | 4/2014 | Xu et al. |
| 2015/0055706 | A1 | 2/2015 | Xu et al. |

FOREIGN PATENT DOCUMENTS

| | | |
|---|---|---|
| EP | 1091592 | 4/2001 |
| EP | 1158806 | 11/2001 |
| EP | 1672926 | 6/2006 |
| EP | 2536146 A2 | 12/2012 |
| GB | 2477033 | 7/2011 |
| WO | WO9941912 | 8/1999 |
| WO | WO2010086041 | 8/2010 |
| WO | WO2012125178 | 9/2012 |

OTHER PUBLICATIONS

Lou J et al: "Motion vector scaling for non-uniform interpolation offset", 7. JCT-VC Meeting; 98. MPEG Meeting; Nov. 21, 2011-Nov. 30, 2011; Geneva; (Joint Collaborative Team on Video Coding of

(56) References Cited

OTHER PUBLICATIONS

ISO/IEC JTC1/SC29IWG11 and ITU-T SG.16 ); URL: http://wftp3.itu.int/av-arch/jctvc-site/, No. JCTVC-G699, Nov. 9, 2011, XP030110683.

Lou J et al: "CE3: Fixed interpolation filter tests by Motorola Mobility", 6. JCT-VC Meeting; 97. MPEG Meeting; Jul. 14, 2011 Jul. 22, 2011; Torino; (Joint Collaborative Team on Video Coding of ISO/IEC JTC1/SC29/WG11 and ITU-T SG.16 ); URL: http://wftp3.itu.int/av-arch/jctvc-site/.No. JCTVC-F574, Jul. 3, 2011, XP030009597.

Karczewicz (Qualcomm) M et al: "Video coding technology proposal by Qualcomm", 1. JCT-VC Meeting; Apr. 15, 2010-Apr. 23, 2010; Dresden; (Jointcollaborative Team on Video Coding of ISO/IEC JTC1/SC29/WG11 and ITU-TSG.16); URL: http://wftp3.itu.int/av-arch/jctvc-site/, Apr. 16, 2010, XP030007568, ISSN: 0000-0049.

Bankoski et al. "Technical Overview of VP8, an Open Source Video Codec for the Web". Dated Jul. 11, 2011.

Bankoski et al. "VP8 Data Format and Decoding Guide; draft-bankoski-vp8-bitstream-02" Network Working Group. Internet-Draft, May 18, 2011, 288 pp.

Bossen, F., "Common test Conditions and Software Reference Configurations," Joint Collaborative Team on Video Coding, JCTVC-D600, Jan. 2011.

Chen, Michael C., et al.; "Design and Optimization of a Differentially Coded Variable Block Size Motion Compensation System", IEEE 1996, 4 pp.

Chen, Xing C., et al.; "Quadtree Based Adaptive Lossy Coding of Motion Vectors", IEEE 1996, 4 pp.

Ebrahimi, Touradj, et al.; "Joint motion estimation and segmentation for very low bitrate video coding", SPIE vol. 2501, 1995, 12 pp.

Guillotel, Philippe, et al.; "Comparison of motion vector coding techniques", SPIE vol. 2308, 1994, 11 pp.

Hong D et al.: "Scalabilty Support in HEVC", 97, MPEG Meeting; Jul. 18, 2011-Jul. 22, 2011; Torino; (Motion Picture Expert Group or ISO/IEC JTC1/SC29/WG11),JCTVCF290, Jul. 13, 2011, all pages.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

ISR & Written Opinion, Re: Application # PCT/US2012/044726; Sep. 27, 2012.

ISR and Written opinion of the International Searching Authoriy for International Application No. PCT/US13/24773, dated Apr. 29, 2013, 13 pages.

Zheng, Y et al., Unified Motion Vector Predictor Selection for merge and AMVP, Mar. 2011.

ISR, ISR Search Report and Written Opinion of the International Searching Authority for International Application No. ISR/US2013/060100 dated Nov. 21, 2013, 11 pages.

Jianghong Guo et al., A Novel Criterion for Block Matching Motion Estimation, Oct. 123, 1998, IEEE, vol. 1 pp. 841-844.

Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.

Liu, Bede, et al.; "A simple method to segment motion field for video coding", SPIE vol. 1818, Visual Communications and Image Processing 1992, 10 pp.

Liu, Bede, et al.; "New Fast Algorithms for the Estimation of Block Motion Vectors", IEEE Transactions on Circuits and Systems for Video Technology, vol. 3, No. 2, Apr. 1993, 10 pp.

Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

Martin, Graham R., et al.; "Reduced Entropy Motion Compensation Using Variable Sized Blocks", SPIE vol. 3024, 1997, 10 pp.

McCann et al., "Video Coding Technology Proposal by Samsung(and BBC)," Joint Collaborative Team on Video Coding, 1st Meeting, Dresden, Germany, JCTVC-A124, Apr. 15-23, 2010.

Nicolas, H., et al.; "Region-based motion estimation using deterministic relaxation schemes for image sequence coding", IEEE 1992, 4 pp.

Nokia, Inc., Nokia Research Center, "MVC Decoder Description", Telecommunication Standardization Sector, Study Period 1997-2000, Geneva, Feb. 7, 2000, 99 pp.

Orchard, Michael T.; "Exploiting Scene Structure in Video Coding", IEEE 1991, 5 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Overview; VP7 Data Format and Decoder. Version 1.5. On2 Technologies, Inc. Dated Mar. 28, 2005.

Park, Jun Sung, et al., "Selective Intra Prediction Mode Decision for H.264/AVC Encoders", World Academy of Science, Engineering and Technology 13, (2006).

Peng, Qiang, T. Yang, and C Zhu, Block-based temporal error concealment for video packet using motion vector extrapolation, 2002 International Conference on Communications, Circuits and Systems and West Sino Exposition Proceedings, 10-14 vol. 1:2.

Schiller, H., et al.; "Efficient Coding of Side Information in a Low Bitrate Hybrid Image Coder", Signal Processing 19 (1990) Elsevier Science Publishers B.V. 61-73, 13 pp.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

Steliaros, Michael K., et al.; "Locally-accurate motion estimation for object-based video coding", SPIE vol. 3309, 1997, 11 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

(56) References Cited

OTHER PUBLICATIONS

Strobach, Peter; "Tree-Structured Scene Adaptive Coder", IEEE Transactions on Communications, vol. 38, No. 4, Apr. 1990, 10 pp.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
Wiegand, Thomas, et al.; "Long-Term Memory Motion-Compensated Prediction", Publication Unknown, Date Unknown, 15 pp.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Wright, R. Glenn, et al.; "Multimedia—Electronic Technical Manual for ATE", IEEE 1996, 3 pp.
Zhang, Kui, et al.; "Variable Block Size Video Coding With Motion Prediction and Motion Segmentation", SPIE vol. 2419, 1995, 9 pp.
Zheng et al., "Extended Motion Vector Prediction for Bi Predictive Mode," Joint Collaborative Team on Video Coding Geneva, Mar. 2011.
International Search Report and Written Opinion for related application PCT/US2013/063723, mailed Feb. 2, 2012.
IPRP and Written Opinion of the International Searching Authority for related International Application No. PCT/US2013060100 mailed Apr. 16, 2015.
Laroche G. et al.: "RD Optimized Coding for Motion Vector Predictor Selection", IEEE Transactions on Circuits and Systems for Video Technology, vol. 18, No. 9, Sep. 1, 2008.
Li S et al.: "Direct Mode Coding for Bipredictive Slices in the H.264 Standard", IEEE Transations on Circuits and Systems for Video Technology, vol. 15, Jan. 1, 2005.
Steffen Kamp et al.: "Decoder side motion vector derivation for inter frame video coding" Image Processing, 2008, 15th IEEE International Conference, Oct. 12, 2008.
Steffen Kamp et al.: "Improving AVC Compression performance by template matching with decoder-side motion vector derivation", 84. MPEG Meeting; Feb. 5, 2008.
Ueda M et al.: "TE1: Refinement Motion Compensation using Decoder-side Motion Estimation" JCT-VC Meeting; Jul. 28, 2007.
Wiegand et al., "WD3: Working Draft 3 of High-Efficiency Video Coding," Mar. 29, 2011 JCTVC-E603, all pages.
Yi-Jen Chiu et al.: "Self-derivation of motion estimation techniques to improve video coding efficiency", Proceedings of SPIE, vol. 7798, Aug. 19, 2010.
Y-Jen Chiu et al.: "Fast Techniques to Improve Self Derivation of Motion Estimation" JCT-VC Meeting, Jul. 28, 2010.
Yue Wang et al.: "Advanced spatial and temporal direct mode for B picture coding", Visual Communications and Image Processing (VCIP), 2011 Ieee, Nov. 6, 2011, pp. 1-4.
Y-W Huang et al.: "Decoder-side Motion Vector Derivation with Switchable Template Matching" JCT-VC Meeting Jul. 28, 2010.

\* cited by examiner

FIG. 1  FIG. 2

FIG. 6              FIG. 7

MOTION VECTOR SCALING FOR NON-UNIFORM MOTION VECTOR GRID

CROSS REFERENCE TO RELATED APPLICATIONS

The present application claims priority to U.S. Provisional App. No. 61/556,147 for "Motion Vector Scaling for Non-Uniform Motion Vector Grid" filed Nov. 4, 2011, the contents of which is incorporated herein by reference in its entirety.

BACKGROUND

High-efficiency video coding (HEVC) is a block-based hybrid spatial and temporal predictive coding scheme. Similar to other video coding standards, such as motion picture experts group (MPEG)-1, MPEG-2, and MPEG-4, HEVC supports intra-picture, such as I picture, and inter-picture, such as B picture. In HEVC, P and B pictures are consolidated into a general B picture that can be used as a reference picture.

Intra-picture is coded without referring to any other pictures. Thus, only spatial prediction is allowed for a coding unit (CU)/prediction unit (PU) inside an intra-picture. Inter-picture, however, supports both intra- and inter-prediction. A CU/PU in an inter-picture may be either spatially or temporally predictive coded. Temporal predictive coding may reference pictures that were previously coded.

Temporal motion prediction is an effective method to increase the coding efficiency and provides high compression. HEVC uses a translational model for motion prediction. According to the translational model, a prediction signal for a given block in a current picture is generated from a corresponding block in a reference picture. The coordinates of the reference block are given by a motion vector that describes the translational motion along horizontal (x) and vertical (y) directions that would be added/subtracted to/from the coordinates of the current block. A decoder needs the motion vector to decode the compressed video.

The pixels in the reference frame are used as the prediction. In one example, the motion may be captured in integer pixels. However, not all objects move with the spacing of integer pixels (also referred to as pel). For example, since an object motion is completely unrelated to the sampling grid, sometimes the object motion is more like sub-pixel (fractional) motion than a full-pel one. Thus, HEVC allows for motion vectors with sub-pixel accuracy.

In order to estimate and compensate sub-pixel displacements, the image signal on these sub-pixel positions is generated by an interpolation process. In HEVC, sub-pixel interpolation is performed using finite impulse response (FIR) filters. Generally, the filter may have 8 taps to determine the sub-pixel values for sub-pixel positions, such as half-pel and quarter-pel positions. The taps of an interpolation filter weight the integer pixels with coefficient values to generate the sub-pixel signals. Different coefficients may produce different compression performance in signal distortion and noise.

FIG. 1 depicts positions of half-pel and fractional-pel (e.g., quarter-pel) pixels between full-pel pixels along a pixel line within an image according to one embodiment. For example, the pixel line may be along a row or column on an image. Multiple interpolation calculations may be made along different rows and columns of an image. Full-pel pixels are represented by integer pixels and are shown in FIG. 1 as pixels L3, L2, L1, L0, R0, R1, R2, and R3. H is a half-pel pixel between full-pel pixels L0 and R0. FL is a sub-pixel pixel (fractional-pel pixel) between full-pel pixels L0 and H and FR is a sub-pixel pixel between half-pel pixel H and full-pel pixel R0.

The fractional-pel and half-pel pixels may be interpolated using the values of spatial neighboring full-pel pixels. For example, the half-pel pixel H may be interpolated using the values of full-pel pixels L3, L2, L1, L0, R0, R1, R2, and R3. Different coefficients may also be used to weight the values of the neighboring pixels and provide different characteristics of filtering.

A uniform sub-pixel spacing may be used. For example, sub-pixel phase offsets are allowed that correspond to quarter, half and three quarter pixel offsets. FIG. 2 is an example of a fixed, uniform, four position sub-pixel motion vector grid, FIG. 3 is an example of a fixed, uniform, eight position sub-pixel motion vector grid, and FIG. 4 is an example of a fixed, uniform, sixteen position sub-pixel motion vector grid. In these three examples, L0 and R0 are the integer pixels and the pixels between L0 and R0 are fractional-pixels.

A motion vector (MV) is a two-dimensional vector ($MV_X$, $MV_Y$) that is used for inter prediction that provides an offset from the coordinates in the decoded picture to the coordinates in a reference picture. The motion vector may be represented by integer numbers, but the accuracy may be at quarter-pel resolution. That is, if one component of the motion vector (either $MV_X$ or $MV_Y$) has a remainder of "0" when dividing by 4, it is an integer-pel motion vector component; if one component of the motion vector has a remainder of "1" when dividing by 4, it is a quarter-pel motion vector component; if one component of the motion vector has a remainder of "2" when dividing by 4, it is a half-pel motion vector component; and if one component of the motion vector has a remainder of "3" when dividing by 4, it is a three-quarter-pel motion vector component.

Motion vectors are predictively coded with predictors chosen from motion vectors of spatial neighboring blocks and/or temporal collocated blocks. The motion vectors of these spatial neighboring blocks and temporal collocated blocks may point to different reference pictures that have a different temporal distance from the reference picture of a current block. To have the motion vector of the spatial neighboring blocks and temporal collocated blocks point to the reference picture of the current block, motion vector scaling is used to scale the motion vector to point to the reference picture of the current block. The scaling uses the differences in temporal distance.

On a uniform motion vector grid, scaling of the motion vector may be very close to scaling of the corresponding motion offset. For example, the motion vector scaling is performed according to temporal distance between the current picture and the reference pictures. Given a current block in a current picture, the motion vector scaling theoretically could be performed as:

$$MV_{Pscaled} = (TD_{ref} \times MV_P)/TD_P \qquad (1)$$

where $MV_P$ is the motion vector predictor for the current block, $TD_{ref}$ is the temporal distance between the current picture and the reference picture for the current block, and $TD_P$ is the temporal distance between the picture where the motion vector predictor $MV_P$ resides and the reference picture that $MV_P$ points to.

If infinite precision is allowed for motion vectors $MV_P$ and $MV_{Pscaled}$, the above equation is accurate. However, if the precision is only at quarter-pel, a good approximation is necessary. For example, assuming in one example, a motion vector component has a value 1 on a four position sub-pixel motion vector grid, and temporal distances $TD_{ref}$ and $TD_P$ are equal to 4 and 1, respectively. By using the scaling equation (1), the motion vector component of value 1 is scaled to:

$$MV_{Pscaled}=(TD_{ref} \times MV_P)/TD_P=(4 \times 1)/1=4$$

On a four position sub-pixel motion vector grid, a motion vector component of value 4 means a motion offset of 1 pel. On uniform four position sub-pixel motion vector grid (FIG. 2), a motion vector component of value 1 represents a motion offset component of ¼ pel. Using the same scaling equation, the motion offset component of ¼ pel is scaled to $$MV_{Pscaled}=(TD_{ref} \times MV_P)/TD_P=(4 \times (¼))/1=1(\text{pel})$$

As seen, for this example, scaling of motion vector component exactly matches scaling of motion offset as both give a motion offset of 1 pel. However, the problem with uniform distribution of sub-sample positions is that it may not be the optimal for a given set of filter restrictions, such as number of taps or the power spectral density of the reference block.

SUMMARY

In one embodiment, a method determines a scaled motion vector for a first block. A motion vector for a second block is determined where values associated with the motion vector are represented on a non-uniform motion vector grid. The second block is a spatially neighboring block or a temporal co-located block to the first block, and the non-uniform motion vector grid has a first number of positions, the non-uniform motion vector grid having non-uniform sub-pixel phase offsets between integer pixels. The method then maps the motion vector values for the second block to a higher accuracy uniform motion vector grid and scales the motion vector values for the second block on the uniform motion vector grid. The uniform motion vector grid has a second number of positions greater than the first number of positions due to the presence of more sub-pixel positions between the integer pixels than the non-uniform motion vector grid and, unlike the non-uniform motion vector grid, provides a uniform distribution of sub-pixel positions between the integer pixels. The scaled motion vector values on the uniform motion vector grid are mapped to the non-uniform motion vector grid. The scaled motion vector values on the non-uniform motion vector grid are associated with the first block for a temporal prediction process.

In one embodiment, a method is provided that determines a scaled motion vector for a first block, the method comprising: receiving a bitstream from an encoder at a decoder; determining a motion vector for a second block that is a spatially neighboring block or a temporal co-located block to the first block using information in the bitstream, wherein values associated with the motion vector are represented on a non-uniform motion vector grid having a first number of positions, the non-uniform motion vector grid having non-uniform sub-pixel phase offsets between integer pixels; mapping, by the decoder, the motion vector values for the second block to a higher accuracy uniform motion vector grid, the uniform motion vector grid having a second number of positions greater than the first number of positions due to the presence of more sub-pixel positions between the integer pixels than the non-uniform motion vector grid and providing a uniform distribution of sub-pixel positions between the integer pixels; scaling, by the decoder, the motion vector values for the second block on the uniform motion vector grid to generate scaled motion vector values; and mapping, by the decoder, the scaled motion vector values on the uniform motion vector grid to the non-uniform motion vector grid, wherein the scaled motion vector values on the non-uniform motion vector grid are associated with the first block for a temporal prediction process to decode the bitstream.

In one embodiment, an apparatus determines a scaled motion vector for a first block, the apparatus comprising: one or more computer processors; and a non-transitory computer-readable storage medium. The medium comprises instructions, that when executed, control the one or more computer processors to determine a motion vector for a second block, wherein the second block is a spatially neighboring block or a temporal co-located block to the first block and values associated with the motion vector are represented on a non-uniform motion vector grid; having a first number of positions, the non-uniform motion vector grid having non-uniform sub-pixel phase offsets between integer pixels. The instructions also control the one or more computer processors to map the motion vector values to a uniform motion vector grid that is of a higher accuracy than the non-uniform motion vector grid as it has a second number of positions greater than the first number of positions due to the presence of more sub-pixel positions between the integer pixels than the non-uniform motion vector grid and provides a uniform distribution of sub-pixel positions between the integer pixels; scale the motion vector values for the second block on the uniform motion vector grid to generate scaled motion vector values; and map the scaled motion vector values on the uniform motion vector grid to the non-uniform motion vector grid. The scaled motion vector values on the non-uniform motion vector grid represent a scaled motion vector that is associated with the first block for a temporal prediction process.

In one embodiment, an apparatus determines a scaled motion vector for a first block. The apparatus comprises one or more computer processors and a non-transitory computer-readable storage medium comprising instructions, that when executed, control the one or more computer processors to be configured for receiving a bitstream from an encoder at a decoder; determining a motion vector for a second block using information in the bitstream, wherein the second block is a spatially neighboring block or a temporal co-located block to the first block and the motion vector values are represented on a non-uniform motion vector grid having a first number of positions, the non-uniform motion vector grid having non-uniform sub-pixel phase offsets between integer pixels; mapping the motion vector values to a uniform motion vector grid having a second number of positions greater than the first number of positions due to the presence of more sub-pixel positions between the integer pixels than the non-uniform motion vector grid and providing a uniform distribution of sub-pixel positions between the integer pixels; scaling the motion vector values on the uniform motion vector grid; and mapping the resulting scaled motion vector values to the non-uniform motion vector grid. The scaled motion vector values represented on the non-uniform motion vector grid are associated with the first block for a temporal prediction process to decode the bitstream.

The following detailed description and accompanying drawings provide a better understanding of the nature and advantages of particular embodiments.

BRIEF DESCRIPTION OF THE DRAWINGS

FIG. 1 depicts positions of half-pel and quarter-pel pixels between full-pel pixels along a pixel line within an image according to one embodiment.

FIG. 2 is an example of a fixed, uniform, four position sub-pixel motion vector grid.

FIG. 6 includes a fixed, non-uniform, four-position sub-pixel motion vector grid with a ⅛ pixel phase offset, a ½ pixel phase offset, and a ⅞ pixel phase offset.

FIG. 7 depicts a fixed, non-uniform, four-position sub-pixel motion vector grid with a 3/16 pixel phase offset, a ½ pixel phase offset, and a 13/16 pixel phase offset.

DETAILED DESCRIPTION

Described herein are techniques for a video compression system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 5:
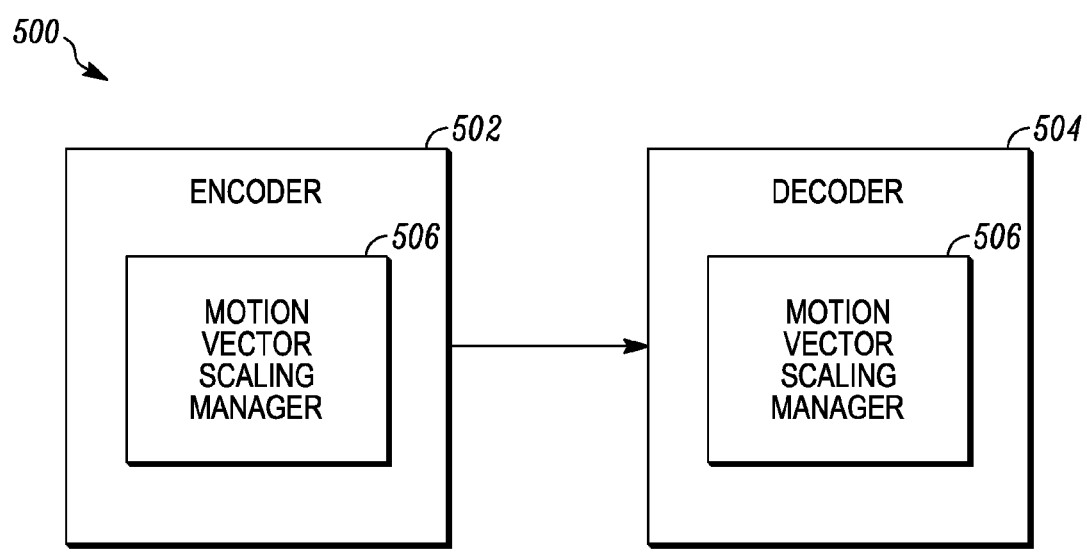
FIG. 5 depicts a simplified system for scaling motion vectors on a non-uniform motion vector grid according to one embodiment.

FIG. 5 depicts a simplified system 500 for scaling motion vectors on a non-uniform motion vector grid according to one embodiment. System 500 includes an encoder 502 and a decoder 504 for encoding and decoding video content. Encoder 502 and decoder 504 perform temporal prediction through motion estimation and motion compensation. Motion estimation is a process of determining a motion vector (MV) for a current block (e.g., a unit) of video. Motion compensation is applying the motion vector to the current block. For example, the temporal prediction searches for a best match prediction for a current prediction unit (PU) over reference pictures. The best match prediction is described by the motion vector and associated reference picture ID. Also, a PU in a B picture may have up to two motion vectors.

The temporal prediction allows for fractional (sub-pixel) picture accuracy. Sub-pixel prediction is used because motion during two instances of time (the current and reference frames' capture times) can correspond to a sub-pixel position in pixel coordinates and generation of different prediction data corresponding to each sub-pixel position allows for the possibility of conditioning the prediction signal to better match the signal in the current PU.

In the temporal prediction process, a motion vector scaling manager 506, either in encoder 502 or decoder 504, uses a motion vector scaling process for a non-uniform motion vector grid. A non-uniform motion vector grid allows non-uniform sub-pixel phase offsets between integer pixels. For example, sub-pixel phase offsets may be non-uniform in spacing and/or include a different number of phase offsets. A phase offset is an offset of a sub-pixel position from a full-pel position. For example, the non-uniform phase offsets may include phase offsets at a ⅛ pixel phase offset, a ½ pixel phase offset, and a ⅞ pixel phase offset in addition to a 0 phase filter that may use the samples without any filtering. Other non-uniform phase offsets may also be appreciated. Conventionally, a fixed resolution of offsets was used, such as phase offsets that correspond to quarter, half, and three-quarter pixel offsets. For example, uniform phase offsets may be ¼, ½, and ¾ offsets where the uniform spacing is ¼ pel. However, a problem with a uniform distribution of sub-pixel positions is that these uniform sub-pixel positions may not be optimal.

In one embodiment, the phase offsets for sub-pixel positions may be determined based on characteristics of the encoding or decoding process. For example, the characteristics may be statistical information from video content, such as broadcast video, being encoded or decoded. Additionally, the characteristics may be a coding condition, such as properties of an interpolation filter, a type of prediction (e.g., from one reference block or from many reference blocks), and/or the compression noise statistical characteristics. Also, optimal sub-pixel positions may require different phase offsets in a vertical dimension and/or a horizontal dimension. Thus, different phase offsets may be selected based on different characteristics of the encoding or decoding process.

Figure 3:
FIG. 3 is an example of a fixed, uniform, eight position sub-pixel motion vector grid.
Figure 4:
FIG. 4 is an example of a fixed, uniform, sixteen position sub-pixel motion vector grid.

FIG. 6 depicts a first example of non-uniform phase offsets and FIG. 7 depicts a second example of non-uniform phase offsets according to one embodiment. FIG. 6 includes a fixed, non-uniform, four-position sub-pixel motion vector grid with a ⅛ pixel phase offset, a ½ pixel phase offset, and a ⅞ pixel phase offset. FIG. 7 depicts a fixed, non-uniform, four-position sub-pixel motion vector grid with a 3/16 pixel phase offset, a ½ pixel phase offset, and a 13/16 pixel phase offset. In both of these examples, L0 and R0 are integer pixels and the pixels between L0 and R0 are fractional-pixels. As seen in FIG. 6, the spacing between sub-pixels is non-uniform. For example, the spacing between pixel L0 and the ⅛ pixel phase offset is different from the spacing between the ⅛ pixel phase offset and the ½ pixel phase offset. Other non-uniform spacing exists between the ½ pixel phase offset and ⅞ pixel phase offset, and the ⅞ pixel phase offset and the R0 pixel. The same is true for the second example shown in FIG. 7. This is contrasted with the pixel phase offsets shown in FIGS. 2-4 in the Background section. Those pixel phase offsets are uniformly spaced between each other.

As described above, motion vectors are predictively coded with predictors chosen from motion vectors of spatial neighboring blocks and/or temporal co-located blocks. Motion vector scaling is used to scale a motion vector for the spatial neighboring block and/or temporal co-located block to a scaled motion vector for the current block. However, when non-uniform phase offsets are used, the scaling as applied to uniform phase offsets may not be accurate for the scaling of the corresponding motion offset for the current block.

Figure 8A:
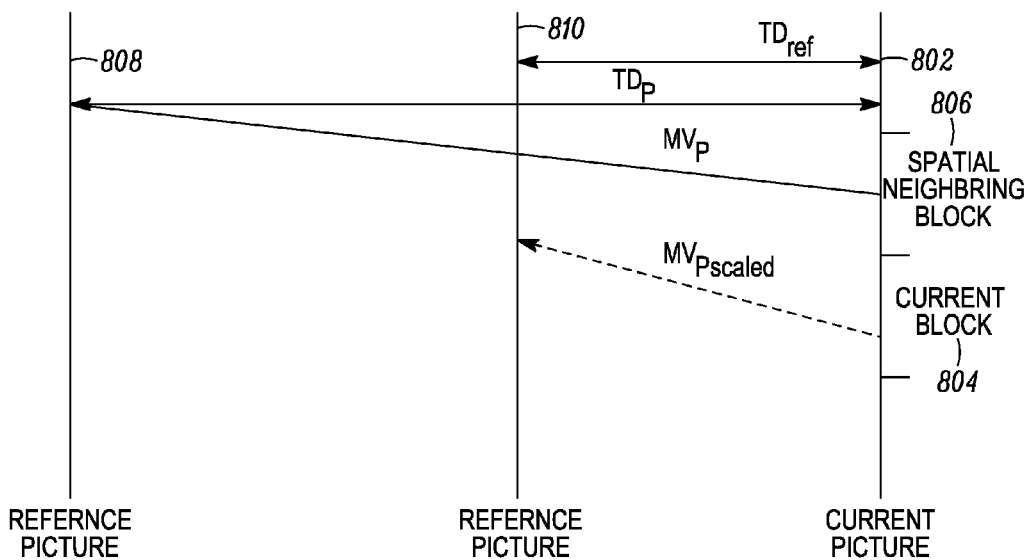
FIG. 8A depicts a motion vector scaling for a spatial neighboring block.
Figure 8B:
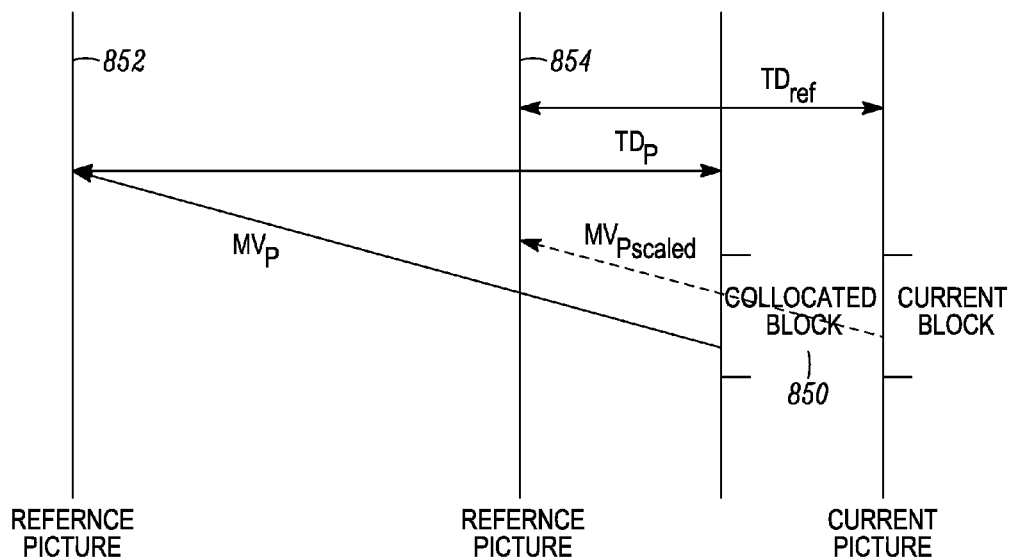
FIG. 8B depicts a motion vector scaling for a temporal co-located block according to one embodiment.

FIG. 8A depicts a motion vector scaling for a spatial neighboring block and FIG. 8B depicts a motion vector scaling for a temporal co-located block according to one embodiment. In FIG. 8A, at 802, a current picture is being coded. At 804, a current block is shown that is being coded. In this case, at 806, a motion vector predictor $MV_P$ for a spatial neighboring block is shown. Motion vector predictor $MV_P$ points to a reference picture at 808. Also, at 810, a reference picture for the current block is shown.

A temporal distance difference between the reference picture at 808 and the reference picture at 810 exists. For example, the temporal distance between the current picture and the reference picture at 808 is a distance $TD_P$ and the temporal distance between the reference picture at 810 and the current picture is a distance $TD_{ref}$. A scaled motion vector $MV_{Pscaled}$ is then calculated for the current block using the temporal distances. Although temporal distance is described, other measures may be used for scaling, such as picture order.

For FIG. 8B, the scaling may be performed for the co-located block shown at 850. In this case, the temporal distance $TD_P$ is the difference between the current picture including the co-located block and a reference picture shown at 852 in which the motion vector predictor $MV_P$ on the co-located block points. Additionally, the temporal distance $TD_{ref}$ is the difference between the current picture including the current block and a reference picture shown at 854. The temporal distances $TD_P$ and $TD_{ref}$ are used to scale the motion vector predictor $MV_P$ to determine a scaled motion vector predictor $MV_{Pscaled}$ for the current block.

When performing scaling as described above in the Background section on a non-uniform four-position sub-pixel motion vector grid as shown in FIG. 6 or 7, a motion vector component of the value "1" represents a motion offset component of the 3/16 pixel phase offset. Using the scaling equation (1), the motion offset component of the 3/16 pixel phase offset is scaled to:

$$MV_{Pscaled} = (TD_{ref} \times MV_P)/TD_P = (4 \times (3/16))/1 = 12/16 (\text{pel})$$

The scaling of the motion vector component of the value "1" gives a motion offset of 1 pel, but the scaling of the motion offset component gives a motion offset of 12/16 pel. The 12/16 pel value is different from the value of 1 pel. This may not be an accurate scaling.

Figure 9:
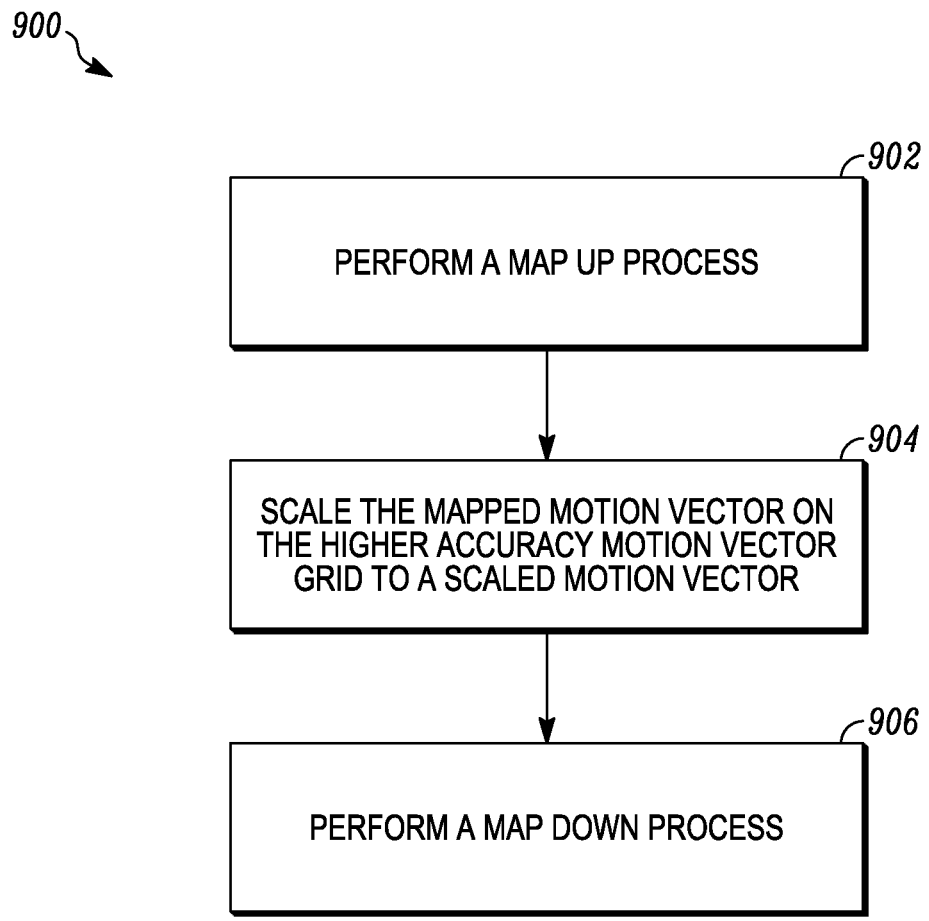
FIG. 9 depicts a simplified flowchart of a method for performing scaling for a non-uniform motion vector grid according to one embodiment.
Figure 10:
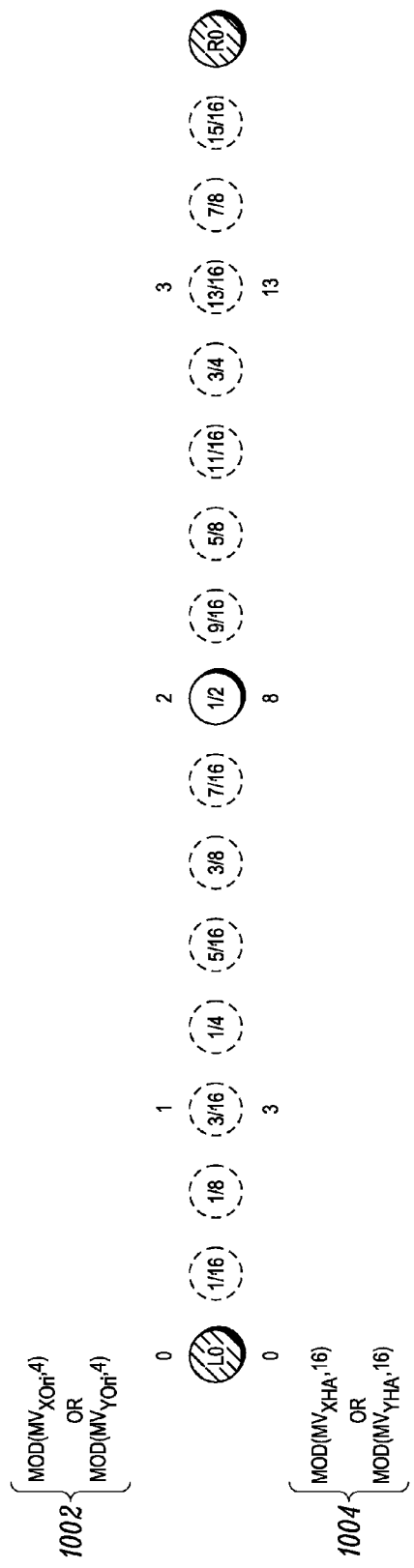
FIG. 10 depicts an example of the map-up process on a non-uniform motion vector grid according to one embodiment.

Accordingly, a motion vector scaling manager 506, either in encoder 502 or decoder 504, uses a motion vector scaling process for a non-uniform motion vector grid that is different from the scaling process for the uniform motion vector grid described above in the Background. FIG. 9 depicts a simplified flowchart 900 of a method for performing scaling for a non-uniform motion vector grid according to one embodiment. At 902, motion vector scaling manager 506 performs a map up process. The map up process maps a motion vector $MV_{XOri}, MV_{YOri}$ on a non-uniform motion vector grid up to a higher accuracy motion vector grid. This results in a mapped motion vector $MV_{XHA}, MV_{YHA}$ on a higher accuracy motion vector grid. FIG. 10 depicts an example of the map-up process on a non-uniform motion vector grid according to one embodiment. In this example, a fixed non-uniform, four-position sub-pixel motion vector grid with a 3/16 pixel phase offset, a 1/2 pixel phase offset, and a 13/16 pixel phase offset is used. Also, integer pixels L0 and R0 are shown. The original motion vector components $MV_{XOri}, MV_{YOri}$ have remainders of 0, 1, 2, and 3 when dividing by 4. This is shown at 1002 where the remainders of 0, 1, 2, and 3 correspond to the L0 pixel, 3/16 sub-pixel offset, the 1/2 sub-pixel offset, and the 13/16 sub-pixel offset.

In the higher accuracy motion vector grid, additional pixel positions are shown in the dotted lines. This increases the accuracy as more sub-pixel positions between pixels L0 and R0 are included in addition to the 3/16, 1/2, and 13/16 sub-pixel positions. In the higher accuracy motion vector grid, higher accuracy motion vector components $MV_{XHA}, MV_{YHA}$ have remainders of 0, 3, 8, and 13 when divided by 16, respectively. This is shown at 1004 where the remainders 0, 3, 8, and 13 correspond to the L0 pixel, 3/16 sub-pixel position, 1/2 sub-pixel position, and 13/16 sub-pixel position. Also, if the non-uniform motion vector grid was not used, then the original motion vector components having remainders of 0, 1, 2, and 3 when dividing by 4 are mapped to the higher accuracy motion vector components having remainders of 0, 4, 8, and 12 when dividing by 16, respectively. Thus, the map up process when a uniform motion vector grid is used does not have any effect.

Referring back to FIG. 9, at 904, motion vector scaling manager 506 scales the mapped motion vector $MV_{XHA}, MV_{YHA}$ on the higher accuracy motion vector grid to a scaled motion vector $MV_{XHAScaled}, MV_{YHAScaled}$. The scaled motion vector is also on the higher accuracy motion vector grid. The scaled motion vector $MV_{XHAScaled}, MV_{YHAScaled}$ is at the same higher accuracy as motion vector $MV_{XHA}, MV_{YHA}$ and can take any position on the higher accuracy motion vector grid. The scaling may be performed as described above with equation (1) where the temporal distances between the reference picture of the motion vector predictor and the temporal distance of the reference picture of the current block are taken into account to scale the motion vector predictor.

Figure 11:
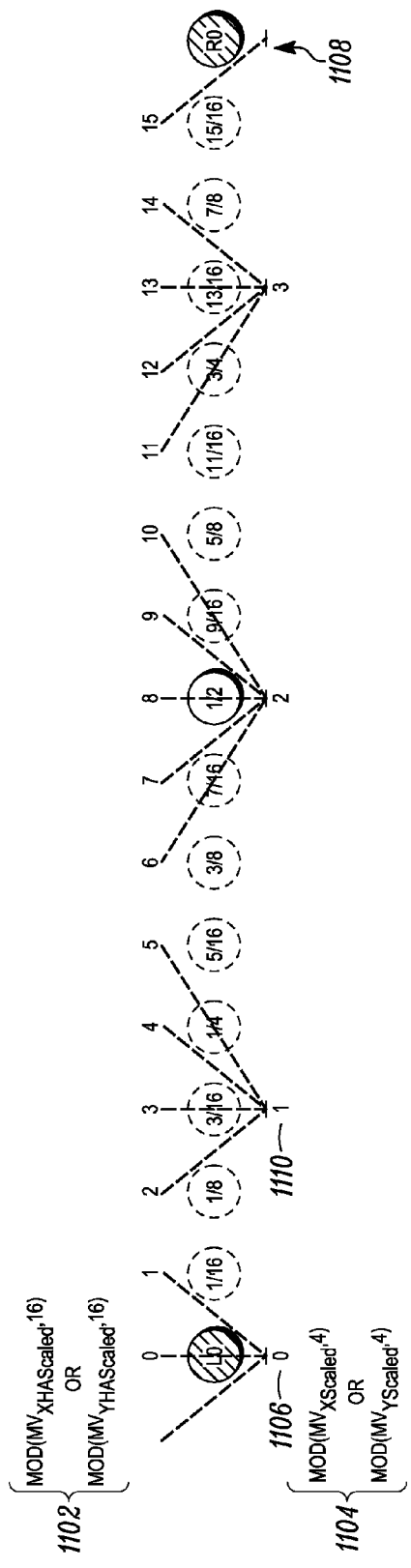
FIG. 11 shows an example of the map down process according to one embodiment.

At 906, motion vector scaling manager 506 performs a map down process. In the map down process, motion vector scaling manager 506 maps the scaled higher accuracy motion vector $MV_{XHAScaled}, MV_{YHAScaled}$ back down to the original non-uniform motion vector grid. This gives a final scaled motion vector $MV_{XScaled}, MV_{YScaled}$ on the original non-uniform motion vector grid. FIG. 11 shows an example of the map down process according to one embodiment. At 1102, the scaled motion vectors on the higher accuracy motion vector grid are shown. The values may take any of the values from the remainder of 0-15 when dividing by 16. At 1104, these values are mapped-down to the original non-uniform motion vector grid to be values of the remainder of 0, 1, 2, or 3 when dividing by 4.

Different algorithms may be used to perform the map-down process. In one example, quantization is performed that maps subsets of values from the higher accuracy motion vector grid to a smaller number of values on the non-uniform motion vector grid based on distance between values. For example, at 1106, if motion vector $MV_{XHAScaled}, MV_{YHAScaled}$ has a remainder of 1 or 15 when dividing by 16, it is quantized to the nearest integer pixel L0 or R0, respectively. For example, the values of 0 and 1 on the higher accuracy motion vector grid are mapped to the value of 0 on the non-uniform motion vector grid. Also, at 1108, the value of 15 is mapped to the integer pixel R0. At 1110, the values of 2-5 on the higher accuracy motion vector grid are mapped to the value of 1 on the non-uniform motion vector grid. Also, the values of 6-10 on the higher accuracy motion vector grid are mapped to the value of 2 on the non-uniform motion vector grid and the values of 11-14 on the higher accuracy motion vector grid are mapped to the value of 3 on the non-uniform motion vector grid. Although these mappings are described, particular embodiments may use other mappings. For example, values 2-4 may be mapped to the value of 1. Other map down algorithms may also be used.

In one example, the 3/16 phase offset in the higher accuracy motion vector grid corresponds to "3". When the scaling is performed using the temporal distance, the scaling may be equal to $(4 \times)(3/16))/1 = 12/16$ pel. The 12/16 pel value is mapped to the phase offset of 3 in the non-uniform motion vector grid. Thus, the same value of 3 is determined in the scaling. Thus, instead of determining the 1 pel value as described above in the Background, particular embodiments determine a value of 13/16 pel, which is closer to 12/16 pel than 1 pel. Accordingly, the scaled motion vector using particular embodiment is more accurate.

Encoder and Decoder Examples

Particular embodiments may be used in both the encoding and decoding processes. In encoding, the motion vector predictor is determined for a current block. Then, motion vector scaling manager 506 determines the scaled motion vector. Encoder 502 may code the motion vector predictor to use for the current block in the bitstream sent to decoder 504. Decoder 504 receives the bitstream for decoding. For the current block, decoder 504 determines the motion vector predictor that was used in the encoding process. Then, motion vector scaling manager 506 determines the scaled motion vector. The following describes encoder 502 and decoder 504 in more detail.

Figure 12A:
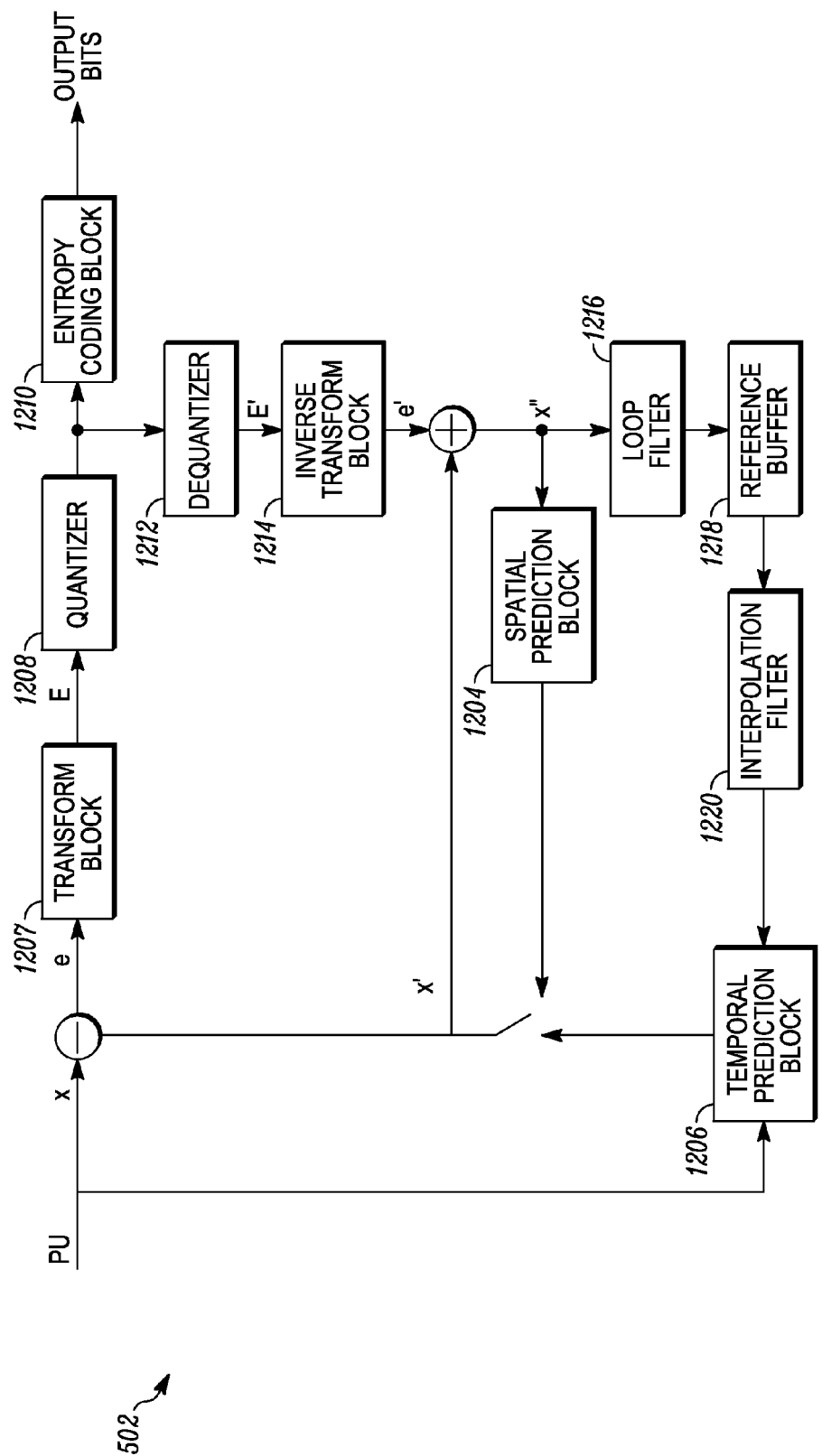
FIG. 12A depicts an example of an encoder according to one embodiment.

FIG. 12A depicts an example of an encoder 502 according to one embodiment. A general operation of encoder 502 will now be described. It will be understood that variations on the encoding process described will be appreciated by a person skilled in the art based on the disclosure and teachings herein.

For a current PU, x, a prediction PU, x', is obtained through either spatial prediction or temporal prediction. The prediction PU is then subtracted from the current PU, resulting in a residual PU, e. A spatial prediction block 1204 may include different spatial prediction directions per PU, such as horizontal, vertical, 45-degree diagonal, 135-degree diagonal, DC (flat averaging), and planar.

A temporal prediction block 1206 performs temporal prediction through a motion estimation and motion compensation operation. The motion estimation operation searches for a best match prediction for the current PU over reference pictures. The best match prediction is described by a motion vector (MV) and associated reference picture (refIdx). The motion vector and associated reference picture are included in the coded bit stream.

Transform block 1207 performs a transform operation with the residual PU, e. Transform block 1207 outputs the residual PU in a transform domain, E.

A quantizer 1208 then quantizes the transform coefficients of the residual PU, E. Quantizer 1208 converts the transform coefficients into a finite number of possible values. Entropy coding block 1210 entropy encodes the quantized coefficients, which results in final compression bits to be transmitted. Different entropy coding methods may be used, such as context-adaptive variable length coding (CAVLC) or context-adaptive binary arithmetic coding (CABAC).

Also, in a decoding process within encoder 502, a de-quantizer 1212 de-quantizes the quantized transform coefficients of the residual PU. De-quantizer 1212 then outputs the de-quantized transform coefficients, E'. An inverse transform block 1214 receives the de-quantized transform coefficients, which are then inverse transformed resulting in a reconstructed residual PU, e'. The reconstructed PU, e', is then added to the corresponding prediction, x', either spatial or temporal, to form the new reconstructed PU, x". A loop filter 1216 performs de-blocking on the reconstructed PU, x", to reduce blocking artifacts. Additionally, loop filter 1216 may perform a sample adaptive offset process after the completion of the de-blocking filter process for the decoded picture, which compensates for a pixel value offset between reconstructed pixels and original pixels. Also, loop filter 1216 may perform adaptive filtering over the reconstructed PU, which minimizes coding distortion between the input and output pictures. Additionally, if the reconstructed pictures are reference pictures, the reference pictures are stored in a reference buffer 1218 for future temporal prediction.

Interpolation filter 1220 interpolates sub-pixel pixel values for temporal prediction block 11206. The phase offsets may be non-uniform. Temporal prediction block 1206 then uses the sub-pixel pixel values outputted by interpolation filter 1220 to generate a prediction of a current PU.

Figure 12B:
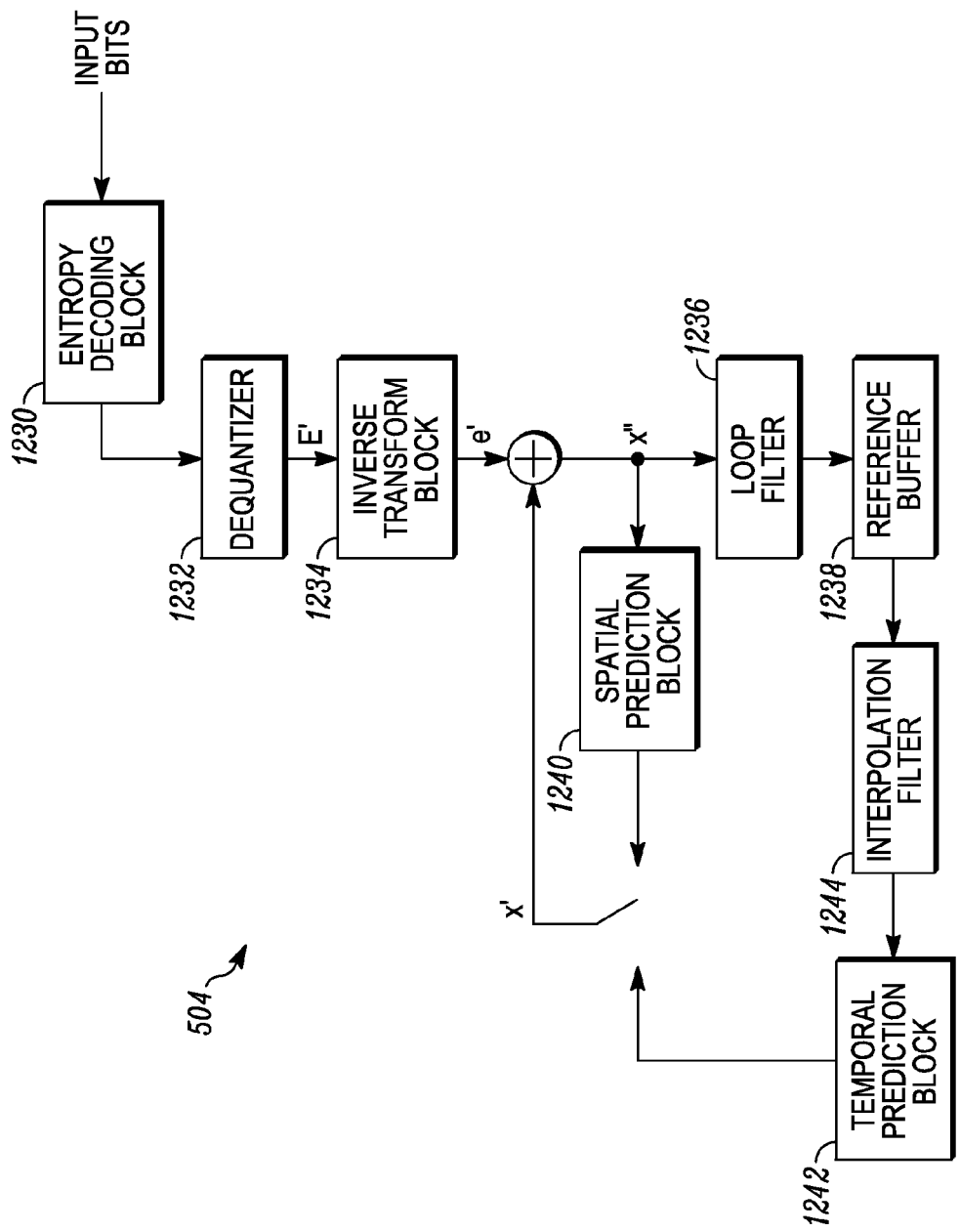
FIG. 12B depicts an example of a decoder according to one embodiment.

FIG. 12B depicts an example of decoder 104 according to one embodiment. A general operation of decoder 504 will now be described. It will be understood that variations on the decoding process described will be appreciated by a person skilled in the art based on the disclosure and teachings herein. Decoder 504 receives input bits from encoder 502 for compressed video content.

An entropy decoding block 1230 performs entropy decoding on input bits corresponding to quantized transform coefficients of a residual PU. A de-quantizer 1232 de-quantizes the quantized transform coefficients of the residual PU. De-quantizer 1232 then outputs the de-quantized transform coefficients of the residual PU, E'. An inverse transform block 1234 receives the de-quantized transform coefficients, which are then inverse transformed resulting in a reconstructed residual PU, e'.

The reconstructed PU, e', is then added to the corresponding prediction, x', either spatial or temporal, to form the new constructed PU, x". A loop filter 1236 performs de-blocking on the reconstructed PU, x", to reduce blocking artifacts. Additionally, loop filter 1236 may perform a sample adaptive offset process after the completion of the de-blocking filter process for the decoded picture, which compensates for a pixel value offset between reconstructed pixels and original pixels. Also, loop filter 1236 may perform an adaptive loop filter over the reconstructed PU, which minimizes coding distortion between the input and output pictures. Additionally, if the reconstructed pictures are reference pictures, the reference pictures are stored in a reference buffer 1238 for future temporal prediction.

The prediction PU, x', is obtained through either spatial prediction or temporal prediction. A spatial prediction block 1240 may receive decoded spatial prediction directions per PU, such as horizontal, vertical, 45-degree diagonal, 135-degree diagonal, DC (flat averaging), and planar. The spatial prediction directions are used to determine the prediction PU, x'.

Interpolation filter 1224 interpolates sub-pixel pixel values for input into a temporal prediction block 1242. The phase offsets may be non-uniform as described above. Temporal prediction block 1242 performs temporal prediction using decoded motion vector information and interpolated sub-pixel pixel values outputted by interpolation filter 106 in a motion compensation operation. Temporal prediction block 1242 outputs the prediction PU, x'.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method, comprising:
   determining a motion vector for a second block that is a spatially neighboring block or a temporal co-located block to a first block, wherein values associated with the motion vector is are represented on a non-uniform motion vector grid having a first number of positions, the non-uniform motion vector grid having non-uniform sub-pixel phase offsets between integer pixels;
   mapping, by a computing device, the values to a uniform motion vector grid, the uniform motion vector grid having a second number of positions greater than the first number of positions due to the presence of more sub-pixel positions between the integer pixels than the non-uniform motion vector grid and providing a uniform distribution of sub-pixel positions between the integer pixels;
   scaling, by the computing device, the values represented on the uniform motion vector grid to generate scaled motion vector values; and
   mapping, by the computing device, the scaled motion vector values represented on the uniform motion vector grid to the non-uniform motion vector grid, wherein the scaled motion vector values represented on the non-uniform motion vector grid are associated with the first block for a temporal prediction process.

2. The method of claim 1, wherein the values represented on the uniform motion vector grid comprises scaling the values based on a difference between a first reference picture for the first block and a second reference picture for the second block.

3. The method of claim 2, wherein the difference is a temporal difference.

4. The method of claim 1, wherein mapping the scaled motion vector values represented on the uniform motion vector grid to the non-uniform motion vector grid comprises using an algorithm to perform the mapping to the non-uniform motion vector grid.

5. The method of claim 4, wherein the algorithm includes mapping a subset of positions on the uniform motion vector grid to a single position on the non-uniform motion vector grid.

6. The method of claim 1, further comprising:
   coding information for the scaled motion vector values in a bitstream for the video content; and
   sending the bitstream from an encoder to a decoder.

7. The method of claim 1, wherein each component of the motion vector is represented on the non-uniform motion vector grid such that each motion vector component is located at a sub-pixel position determined by a remainder resulting from dividing the motion vector component by the first number of positions.

8. A method, comprising:
   receiving a bitstream from an encoder at a decoder;
   determining a motion vector for a second block that is a spatially neighboring block or a temporal co-located block to a first block using information in the bitstream, wherein values associated with the motion vector are represented on a non-uniform motion vector grid having a first number of positions, the non-uniform motion vector grid having non-uniform sub-pixel phase offsets between integer pixels;
   mapping, by the decoder, the values to a uniform motion vector grid, the uniform motion vector grid having a second number of positions greater than the first number of positions due to the presence of more sub-pixel positions between the integer pixels than the non-uniform motion vector grid and providing a uniform distribution of sub-pixel positions between the integer pixels;
   scaling, by the decoder, the values represented on the uniform motion vector grid to generate scaled motion vector values; and
   mapping, by the decoder, the scaled motion vector values represented on the uniform motion vector grid to the non-uniform motion vector grid, wherein the scaled motion vector values represented on the non-uniform motion vector grid are associated with the first block for a temporal prediction process to decode the bitstream.

9. The method of claim 8, wherein scaling the values represented on the uniform motion vector grid comprises scaling the values based on a temporal difference between a first reference picture for the first block and a second reference picture for the second block.

10. An apparatus, comprising:
    one or more computer processors; and
    a non-transitory computer-readable storage medium comprising instructions, that when executed, control the one or more computer processors to be configured for:
       determining a motion vector for a second block that is a spatially neighboring block or a temporal co-located block to a first block, wherein values associated with the motion vector are represented on a non-uniform motion vector grid having a first number of positions, the non-uniform motion vector grid having non-uniform sub-pixel phase offsets between integer pixels;
       mapping the values to a uniform motion vector grid, the uniform motion vector grid having a second number of positions greater than the first number of positions due to the presence of more sub-pixel positions between the integer pixels than the non-uniform motion vector grid and providing a uniform distribution of sub-pixel positions between the integer pixels;
       scaling the values represented on the uniform motion vector grid to generate scaled motion vector values; and
       mapping the scaled motion vector values represented on the uniform motion vector grid to the non-uniform motion vector grid, wherein the scaled motion vector values represented on the non-uniform motion vector grid are associated with the first block for a temporal prediction process.

11. The apparatus of claim 10, wherein scaling the values represented on the uniform motion vector grid comprises scaling the values based on a difference between a first reference picture for the first block and a second reference picture for the second block.

12. The apparatus of claim 11, wherein the difference is a temporal difference.

13. The apparatus of claim 10, wherein mapping the scaled motion vector values represented on the uniform motion vector grid to the non-uniform motion vector grid comprises using an algorithm to perform the mapping to the non-uniform motion vector grid.

14. The apparatus of claim 13, wherein the algorithm includes mapping a subset of positions on the uniform motion vector grid to a single position on the non-uniform motion vector grid.

15. The apparatus of claim 10, further operable for:
coding information for the scaled motion vector values in a bitstream for the video content; and
sending the bitstream from an encoder to a decoder.

16. The apparatus of claim 10, further operable for:
receiving a bitstream from an encoder at a decoder;
determining the motion vector for the second block using information in the bitstream; and
performing the scaling to determine the scaled motion vector values for a decoding process of the bitstream.

17. An apparatus, comprising:
one or more computer processors; and
a non-transitory computer-readable storage medium comprising instructions, that when executed, control the one or more computer processors to be configured for:
receiving a bitstream from an encoder at a decoder;
determining a motion vector for a second block that is a spatially neighboring block or a temporal co-located block to a first block using information in the bitstream, wherein values associated with the motion vector are represented on a non-uniform motion vector grid having a first number of positions, the non-uniform motion vector grid having non-uniform sub-pixel phase offsets between integer pixels;
mapping the values to a uniform motion vector grid, the uniform motion vector grid having a second number of positions greater than the first number of positions due to the presence of more sub-pixel positions between the integer pixels than the non-uniform motion vector grid and providing a uniform distribution of sub-pixel positions between the integer pixels;
scaling the values represented on the uniform motion vector grid to generate scaled motion vector values; and
mapping the scaled motion vector values represented on the uniform motion vector grid to the non-uniform motion vector grid, wherein the scaled motion vector values represented on the non-uniform motion vector grid are associated with the first block for a temporal prediction process to decode the bitstream.

* * * * *